Jan. 27, 1970 J. MAX ET AL 3,492,466

APPARATUS FOR EFFECTING THE HARMONIC ANALYSIS OF A FUNCTION

Filed April 22, 1965

3,492,466

APPARATUS FOR EFFECTING THE HARMONIC ANALYSIS OF A FUNCTION

Jacques Max, Seyssinet, and Marcel Nougaret, Lyon, France, assignors to Commissariat a l'Energie Atomique, Paris, France Filed Apr. 22, 1965, Ser. No. 452,045
Claims priority, application France, Apr. 23, 1964, 972,107
Int. Cl. G06g 7/26; G01r 23/16, 27/02
U.S. Cl. 235—150.53 3 Claims

ABSTRACT OF THE DISCLOSURE

The function $f(x)$ to be analyzed is stored in a digital analog function generator. A reference clock controls a frequency divider which controls the frequency for restoring the data of the generator in analog form. The output of the generator goes into a single selective filter tuned to a basic frequency which produces a signal corresponding to the harmonic of the function.

It is known that, subject to certain conditions which are in any case always satisfied in the case of a function which is known by its physical representation as contemplated by the present invention, a function $f(x)$ can be split up within the interval (—T, +T) into a Fourier series and expressed in the algebraic form:

$$f(x)=b_0+\sum_{n=1}^{\infty} a_n \sin \frac{\pi n}{T} x+\sum_{n=1}^{\infty} b_n \cos \frac{\pi n}{T} x$$

wherein the coefficients $b_0$, $a_n$ are given by the following equations:

$$b_0=\frac{1}{2T}\int_{-T}^{+T} f(X)dx$$

$$b_n=\frac{1}{2T}\int_{-T}^{+T} f(x) \cos \frac{\pi n}{T} xdx$$

$$a_n=\frac{1}{2T}\int_{-T}^{+T} f(x) \sin \frac{\pi n}{T} xdx$$

A splitting-up of the function $f(x)$ as thus defined constitutes the harmonic analysis of this function $f(x)$ within the interval (—T, +T).

In the general case in which a function $f(x)$ of a physical quantity is known by its physical representation, the harmonic analysis or, in other words, the determination of the spectral lines of this function, entails time-consuming and tedious operations which are resolved experimentally by planimetric methods when the use of a data processor cannot be contemplated.

However, one method is known whereby the harmonic analysis of a function $f(x)$ is carried out within an interval (—T, +T) of the variable. To this end, there are successively fed into a selective filter which is tuned to the fixed frequency $1/2\theta_0$ the functions $$F_k\left(\theta \cdot \frac{T}{k\theta_0}\right)$$

of periods $2k\theta_0$ ($k$ integral >0) which are deduced from $f(x)$ by repetition of these latter at frequencies having the form $1/2k\theta_0$, there being then collected at the output of the filter a signal which represents the harmonic having the range $k$.

This invention is directed to an electronic apparatus of relatively simple design which makes it possible to achieve this result in a very short time.

The apparatus referred-to is characterized in that it essentially comprises a function generator which is preferably of the digital analog type wherein the function $f(x)$ to be analyzed is stored in digital form in a memory system, a frequency control unit consisting of a reference clock which is associated with a frequency divider, said control unit being designed to control the frequency at which the data contained in the function generator are restored in analog form, said function generator being designed to deliver at its output the function $F_k(\theta)$ which is finally directed into a selective filter tuned to the basic frequency $1/2\theta_0$.

In order that the characteristics of this invention may become more readily apparent, one example of embodiment will now be described, it being understood that said form of embodiment does not have any limitative character as regards the modes of operation thereof or the uses to which it may be applied.

Figure 1:
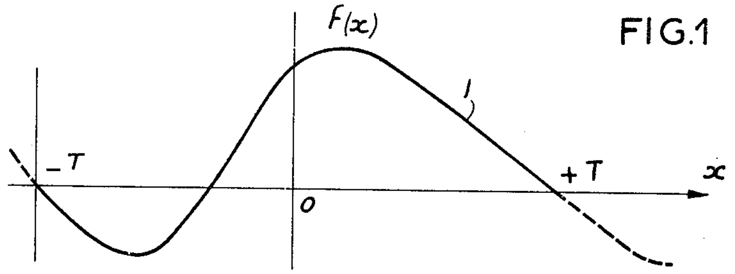
FIG. 1 represents the function which it is desired to analyze.
Figure 2:
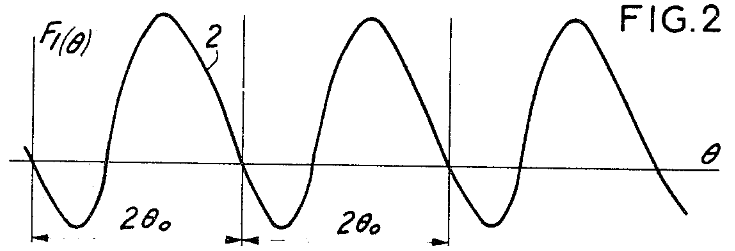
FIG. 2 is a graph of the function having the periods $2\theta_0$, $f_1(\theta)$ which represents the function being analyzed.

Let $f(x)$ be the function which is represented by curve 1 in FIG. 1 and which it is desired to subject to harmonic analysis within the interval (—T, +T). If use is made of a function generator which produces a periodic function $F_1(\theta)$ having a period $2\theta_0$ such that, throughout the interval $(n-1)\theta_0<\theta<(n+1)\theta_0$, we have the equality:

$$F_1(\theta)=f\left(\theta\frac{T}{\theta_0}\right)$$

we then have available a periodic function $F_1(\theta)$ having a period $2\theta_0$ which represents the function $f(x)$ within the interval of one period. Such a function $F_1(\theta)$ is represented in the graph of FIG. 2 by the curve 2.

It is then merely necessary in accordance with the method which has already been described to feed this periodic function $F_1(\theta)$ into a selective filter of known type which is tuned to the frequency $1/2\theta_0$, that is to say which allows this frequency alone to pass in order to obtain at the output the fundamental harmonic H1 of the function $F_1(\theta)$. Taking into account the mathematical relation which joins the function $F_1(\theta)$ to the function $f(x)$, this fundamental component of $F_1(\theta)$ is also that of $f(x)$.

Similarly, it is possible by means of a function generator to generate a periodic function having a period $4\theta_0$ such that, in any interval $(n-1)2\theta_0<\theta<(n+1)2\theta_0$, the mathematical relation:

$$F_2(\theta)=F\left(\theta\cdot\frac{T}{2\theta_0}\right)$$

is satisfied.

Figure 3:
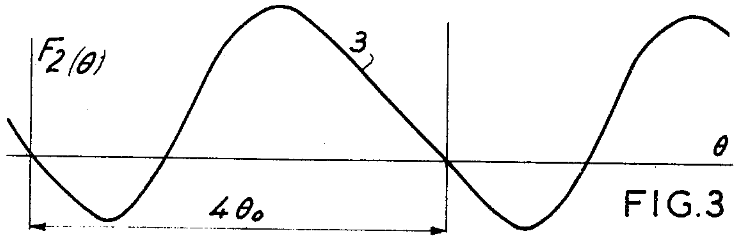
FIG. 3 is a graph of a periodic function which makes it possible to analyze a harmonic of said function as represented in FIG. 1.

Curve 3 which represents such a function $F_2(\theta)$ having a period $4\theta_0$ is plotted in FIG. 3.

Now, if this function is fed into the input of the same selective filter which is still tuned to the same frequency $1/2\theta_o$, it can readily be visualized that there is obtained at the output the harmonic corresponding to the range 2, $H_2$, of the function $f(x)$.

Generally speaking, it is apparent that, if the function generator makes it possible to obtain a function $$F_k(\theta)=f\left(\theta\frac{T}{k\theta_o}\right)$$

which is satisfied, it is merely necessary to feed this function into the same selective filter which is still tuned to the frequency $1/2\theta_o$ in order to obtain at the output the harmonic $H_k$, corresponding to the range $k$ of the function $f(x)$.

In accordance with one important characteristic feature of the method of the invention, all of the functions $F_k$ are produced in practice by means of a same function generator and especially of the digital analog type: in units of this type, each value of the function $f(x)$ is displayed and stored directly in digital form whilst the different functions $F_k(\theta)$ are delivered in analog form at frequencies $1/2\theta_o$, $1/4\theta_o$, $1/2k\theta_o$. Devices of this type are available on the market in the form, for example, of numerical storage units in which the decoding both of the content and the address is carried out by the analog method, these storage units being most suitable for the application of different cycling times since it is merely necessary to produce a variation in the control frequency which is obtained from a synchronization clock and then to give said frequency the sequence of values:

$$1/2\theta_o,\ 1/4\theta_o,\ 1/2k\theta_o,$$

in order to obtain the functions:

$$F_1(\theta), F_2(\theta)\ \ldots\ F_k(\theta)$$

It is also possible to employ certain multi-channel selectors comprising numerical storage units of this type.

The present invention is also concerned with an apparatus for the practical application of the method hereinabove described and which makes it possible to obtain directly in analog form the coefficients $a_n$ and $b_n$ of the analysis of the function $f(x)$ into a Fourier series.

This apparatus essentially comprises a function generator which is preferably of the digital analog type wherein the function $f(x)$ to be analyzed is stored in digital form, a frequency control unit consisting of a reference clock associated with a frequency divider. Said control unit serves to control the frequency at which the data contained in the function generator are restored in analog form, the function $F_k(\theta)$ being delivered at the output of said function generator and finally directed into a selective filter which is tuned to the basic frequency $1/2\theta_o$.

Referring now to the diagrammatic FIGURE 4, there will be described below in greater detail one particular form of embodiment of the apparatus in accordance with the invention which is given by way of example without implied limitation.

A digital analog function generator 4 contains in storage the function $f(x)$ within an interval (−T, +T). A clock 5 having a basic frequency $$F_o=\frac{1}{2\theta_o}$$

emits on line 6 and the frequency divider 7 transmits to the line 8 a signal having the frequency $$\frac{F_o}{k}=\frac{1}{2k\theta_o}$$

The frequency divider 7 is controlled at 9 in a manner which is known per se and makes it possible to vary the coefficient of division $k$ by positive integral values. In accordance with the invention, the signal which is present on line 8 causes the function $f(x)$ to be restored by the function generator 4 in the form of a function $F_k(\theta)$. The corresponding signal is traversed by the line 10. This function $F_k(\theta)$ is finally fed into the selective filter 11 which is tuned to the basic frequency $$F_o=\frac{1}{2\theta_o}$$

and produced, for example, by means of a synchronous demodulation system. There is then collected on the output line 12 a signal which corresponds to the harmonic of range $k$ of the function $f(x)$.

The synchronism of the filter 11 with the clock 5 is ensured by means of the connection 13. One of the advantages of the device according to this invention which is by no means negligible is that, inasmuch as the basic frequency $F_o$ is the control frequency of the entire apparatus, no detrimental effect need be expected in the event that this frequency were to drift to a certain extent.

Figure 4:
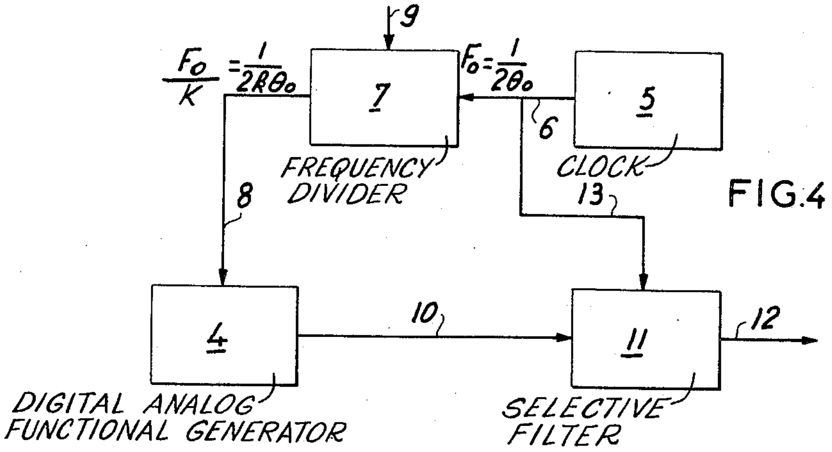
FIG. 4 is a block diagram of the apparatus in accordance with the invention.

The apparatus of FIG. 4 is both simple and considerably less costly to produce than those installations which call for the use of a data processor. As a consequence, the desired result can thus be obtained rapidly under the best conditions. This apparatus can be employed in particular in the following interesting manner for the purpose of splitting-up into a Fourier series any known function within the interval (−T, +T). Such a function can be considered as the sum of two functions, one function $g_1(t)$ being even and the other function $g_2(t)$ being odd.

$$g(t)=g_1(t)+g_2(t)$$

with $$g_1(t)=\tfrac{1}{2}[g(t)+g(-t)] \text{ and } g_2(t)=\tfrac{1}{2}[g(t)-g(-t)]$$

The practical development of these two functions $g_1(t)$ and $g_2(t)$ is carried out very simply by means of a digital analog function generator as soon as the function $g(t)$ is known.

Since the function $g_1$ is even and only contains cosine terms of the Fourier series development of $g(t)$, its treatment by the method proposed above accordingly makes it possible to obtain this portion of the development; the same treatment applied to the odd function $g_2(t)$ will make it possible to obtain the sine terms of the development. It will thus have been possible as a result of two operations instead of one to split up into a Fourier series any function which is given by its physical representation.

This method is extremely flexible and can be made entirely automatic, thus providing very considerable advantages over the methods employed heretofore.

A further important application of the apparatus in accordance with this invention consists in determining the power spectrum of a random signal when this spectrum is rich in low frequency harmonics. In a case of this type, conventional methods which make use of band filtering cannot be employed by reason of the difficulty which is encountered in the design of filters for very low frequencies, for example frequencies below a few cycles per second. The self-correlation function of the signal is in this case determined by means of a known device, the power spectrum of this random signal being obtained by harmonic analysis in accordance with the present invention.

What we claim is:

1. Apparatus for the harmonic analysis of a function $f(x)$ which is known by its physical representation comprising a digital analog function generator wherein the function $f(x)$ to be analyzed is stored in digital form in a memory system forming a part of said generator, a frequency divider controlled by a reference clock controlling the frequency for restoring the data in said generator in analog form, said function generator producing a signal supplied to a selective filter tuned to the basic frequency $\tfrac{1}{2}\theta_o$, said filter producing a signal corresponding to the harmonic of the function $f(x)$.

2. Apparatus as described in claim 1, said function generator consisting of a multi-channel selector comprising a numerical memory system, the content of which is decoded in analog form.

3. Apparatus as described in claim 1, said filter being a synchronous detector.

References Cited

UNITED STATES PATENTS

| | | | |
|---|---|---|---|
| 2,971,155 | 2/1961 | Hurvitz | 324—77 |
| 3,217,151 | 11/1965 | Miller et al. | 235—150.53 |
| 3,250,903 | 5/1966 | Vasu et al. | 235—186 |
| 3,320,531 | 5/1967 | Wu | 324—77 |
| 3,344,350 | 9/1967 | Stoft | 324—77 |

OTHER REFERENCES

Hofheimer et al.: Digital-Analog Function Generators, IRE Transactions on Instrumentation, June 1958, pp. 111 to 117 relied on.

MALCOLM A. MORRISON, Primary Examiner

JOSEPH E. RUGGIERO, Assistant Examiner

U.S. Cl. X.R.

324—77